United States Patent
Franco da Encarnacao

[11] Patent Number: 5,857,289
[45] Date of Patent: Jan. 12, 1999

[54] STRESSMETER

[76] Inventor: Fernando Antonio Franco da Encarnacao, Rua Leobina Pereira, 38 (J. Sao Paulo), 50910-260 Recife, Brazil

[21] Appl. No.: 696,233

[22] Filed: Aug. 13, 1996

Related U.S. Application Data

[63] Continuation-in-part of Ser. No. 389,122, Feb. 10, 1995, abandoned.

[51] Int. Cl.$^6$ ................................ A01G 31/00
[52] U.S. Cl. .................................... 47/79
[58] Field of Search ............... 47/62, 79, 65.5

[56] References Cited

U.S. PATENT DOCUMENTS

| | | | |
|---|---|---|---|
| 4,805,342 | 2/1989 | Jenkins et al. | 47/79 |
| 5,046,282 | 9/1991 | Whitaker | 47/79 |
| 5,174,062 | 12/1992 | Kim | 47/79 |

FOREIGN PATENT DOCUMENTS

| | | | |
|---|---|---|---|
| 1156464 | 8/1983 | Canada | 47/79 V |
| 1196189 | 11/1985 | Canada | 47/79 V |
| 1078471 | 11/1954 | France | 47/79 V |
| 2396502 | 3/1979 | France | 47/79 V |
| 2595535 | 9/1987 | France | 47/79 V |
| 2683121 | 5/1993 | France | 47/79 V |
| 2509723 | 9/1976 | Germany | 47/79 V |
| 1384287 | 2/1975 | United Kingdom | 47/79 V |

*Primary Examiner*—Michael J. Carone
*Assistant Examiner*—Joanne C. Downs
*Attorney, Agent, or Firm*—Harrison & Egbert

[57] ABSTRACT

An apparatus for determining a critical level of soil humidity for plants including an external body, a soil recipient container hermetically sealed to the external body so as to receive a soil sample therein, a well positioned within the external body and containing water therein, a pressure cell connected to the well so as to controllably pass water from the well to the soil recipient container, and an air admitting pipe in sealed relationship with the external body. The pressure cell has a preestablished resistance to the passage of water. The soil recipient container has a collecting pipe thereon for passing water into the soil. The air admitting pipe has an end which opens exterior of the external body so as to allow air to pass into the external body. The air admitting pipe communicates with the pressure cell. The air admitting pipe serves to transmit air into the pressure cell when energy in the soil recipient container is higher than the resistance of the pressure cell. The pressure cell then urges water from the well into the collecting pipe of the soil recipient container.

3 Claims, 4 Drawing Sheets

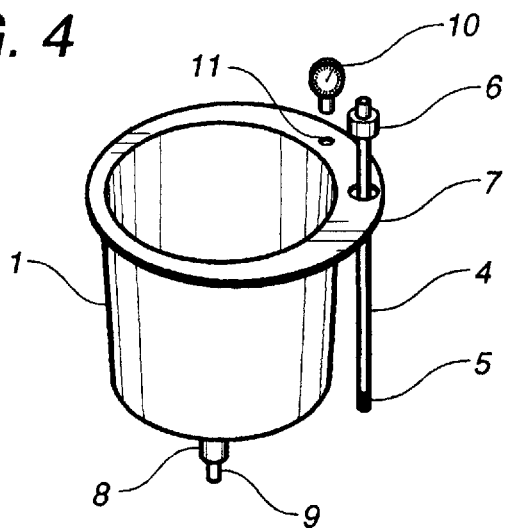
FIG. 4
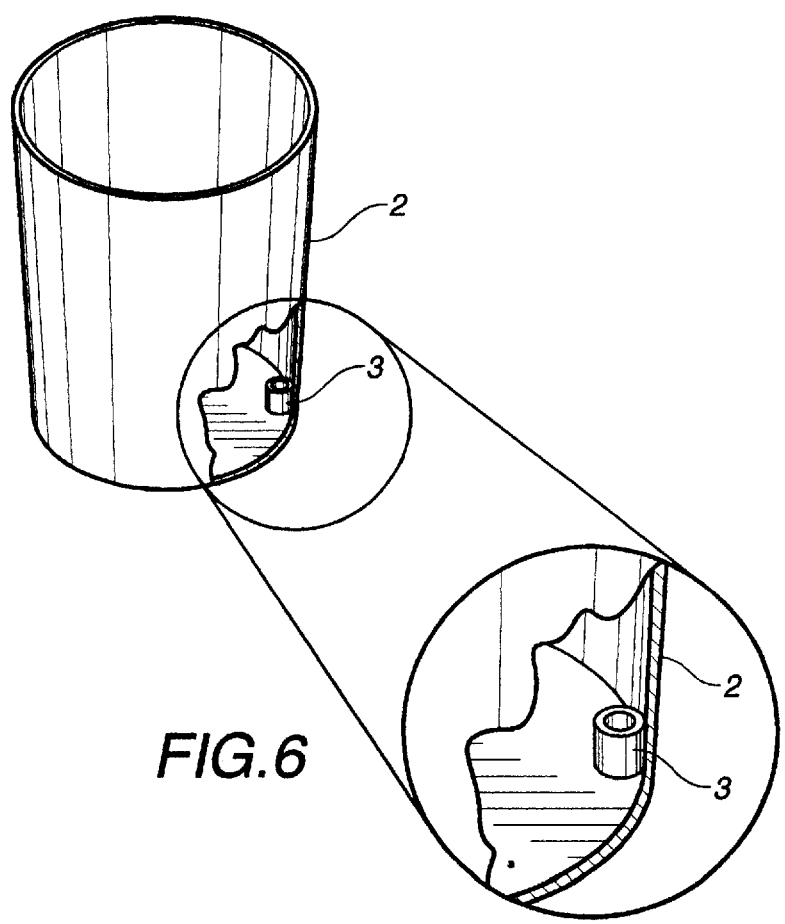
FIG. 5
FIG. 6

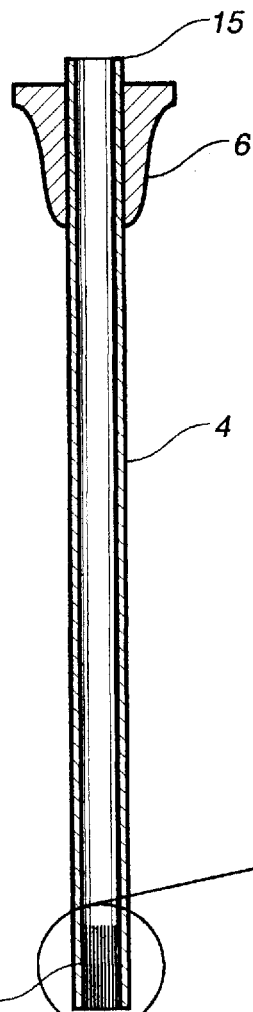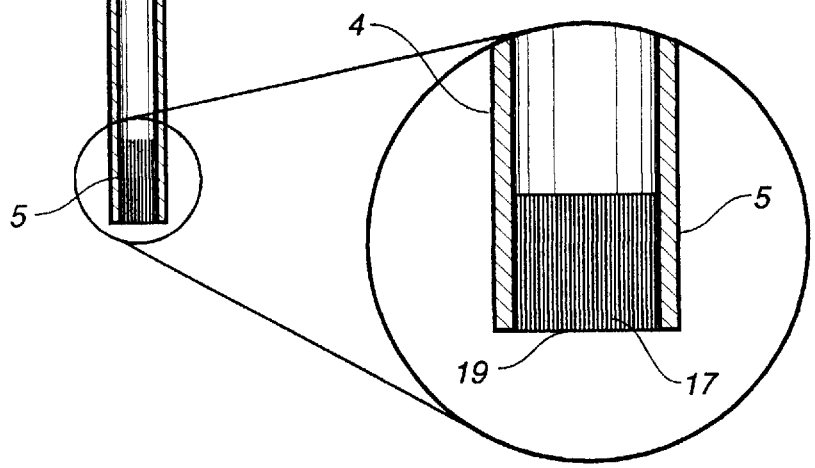

5,857,289

STRESSMETER

RELATED APPLICATION

The present application is a continuation-in-part of U.S. Patent application Ser. No. 08/389,122, filed on Feb. 10, 1995, and entitled "STRESSMETER", now abandoned.

TECHNICAL FIELD

The present invention relates to equipment to determine the lowest level of humidity of the soil from which the plant starts its productivity depression process (PDP), practically known in irrigation jargon as the lowest limit of the useful water layer (UL).

BACKGROUND ART

Presently, there does not exist any apparatus to accurately measure the lowest limit of the useful water layer (UL), i.e., the humidity level of the soil from which the plant starts off a reduction in its production or "Productivity Depression Point (PDP)."

While growing crops based on irrigation techniques, two common questions are relevant: how much and when to irrigate? The answers have to be given instantly. As for the first one, an instrument has been recently developed to accurately answer the question in a few seconds. It is the HIDROCAPACITOR Yo (U.S. Pat. No. 8,903,754)/

The second question--when to irrigate? Water must be added to the soil when the potential of- such water is still sufficiently high (less negative), without exposing the plant to a water need that may affect its development and when the hydraulic conductivity of the soil is high enough (as per Darcy's equation) to meet the evapo-transpirative demand. Water must be supplied to the right quantity, avoiding losses either by superficial flow-off or by deep drainage. In practical terms, this criterion is usually simplified by meeting the conditions of each particular case. In an extreme case, the farmer irrigates the crop at his own discretion based on a subjective criterion acquired by experience. In case of a rational operation—when an optimization of the quantity of water is intended—adding water to the soil must obey a more scientific criterion.

The concept of water availability is complex and presents a big variability from situation to situation. All in all, however, most plants have their growth affected when the potential matrix of the soil water reaches values under −5 atm. Thus, to avoid water "STRESSING", the irrigation is recommended when the potential of the water in the soil reaches values close to −8 atm.

Yet, each type of crop has an optimum water potential interval for each growth stage.

In the lack of equipment or instrumentation to determine the critical humidity (PDP), experimental data is utilized. Such data, however, whose validity is arguable, are only valid for those hedapho-climatical conditions and the variety for which they were established.

For the temperate regions, there already exist experimental data for many crops. The estimates are obtained through experiments by submitting the crop to different levels of humidity and by verifying from which level of humidity the decline in production starts to occur. The method is rather complex, expensive and toilsome, with its results considered to be valid if restricted to the areas and conditions where they were obtained.

Aiming at the establishment of a simple, quick and economic procedure to eliminate the faults and errors in the estimates of the above described PDP, the present invention was developed.

These and other objects and advantages of the present invention will become apparent from a reading of the attached specification and appended claims.

SUMMARY OF THE INVENTION

The stressmeter is an equipment to accurately determine the productivity depression point (PDP) of any species of plants, growing in any type of soil, by establishing a level of constant humidity during all the development of the plant, considering that the pressure cell guarantees a pre-established soil humidity which can contemplate from water to humidity retained at −15 atm. This equipment is the one and only that can be operated within this zone of tension, also offering points (as close as the intended ones) to allow the drawing of humidity curves versus production of dry matter, efficiency in the use of water, among others.

The present invention is an apparatus for determining a critical level of soil humidity for plants which comprises an external body, a soil recipient container hermetically sealed to the external body, a well positioned within the external body, a pressure cell positioned in the well so as to controllably pass water from the well to the soil recipient container, and an air admitting pipe in sealed relationship with the external body. The soil recipient container serves to receive a soil therein. The soil recipient container has a collecting pipe thereon for passing water to the soil. The well contains water within the external body. The pressure cell has an established resistance to the passage of water. The air admitting pipe has an end opening exterior of the external body so as to allow air to pass into the air admitting pipe. The air admitting pipe communicates with the pressure cell. The air admitting pipe serves to transmit air into the pressure cell when energy in the soil recipient container is higher than the resistance of the pressure cell. The pressure cell serves to urge water from the well into the collecting pipe.

The pressure cell is positioned permanently under the water in the well at a constant level. The pressure cell serves to form a meniscus having a pre-established strength for resisting water movement toward the soil. The pressure cell is permanently under the water in the well. The pressure cell has a plurality of pores formed therein.

BRIEF DESCRIPTION OF THE DRAWINGS

FIG. 4 is a perspective view of the soil recipient container of the present invention.

FIG. 5 is a perspective view of the present invention fragmented so as to show the pressure well.

FIG. 6 is a magnified view of the fragmented area of FIG. 5.

FIG. 7 is an isolated view of the air admitting pipe as used in the external body of the present invention showing a fragmented view of the pressure cell.

FIG. 8 is a magnified view of the pressure cell of the present invention.

DETAILED DESCRIPTION OF THE INVENTION

Figure 1:
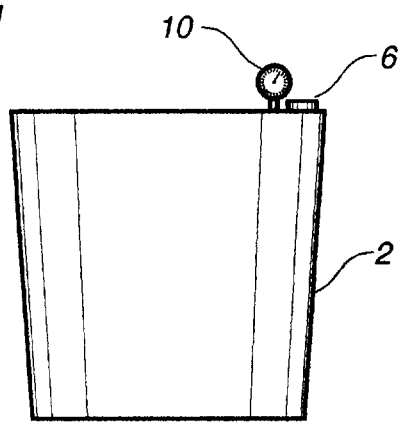
FIG. 1 is a side elevational view of the exterior of the assembled equipment of the present invention.

The structure of the stressmeter of the present invention is illustrated with particularity in FIGS. 1–8. FIG. 1 is a side view of the external part of the assembled equipment, standing out the external body (2), the sealing cap (6) inserted in the sealing cavity (7), and a manometer (10) to register the internal pressure. This pressure is represented by the force with which the water is retained by the soil or the quantity of energy liberated by the plant while removing water from the soil.

Figure 2:
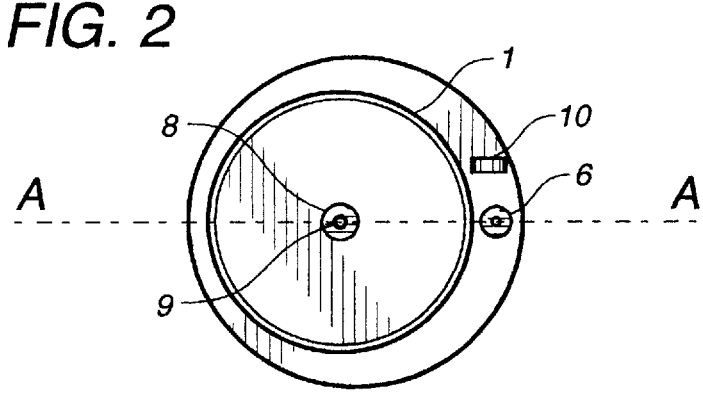
FIG. 2 is a plan view of the equipment of the present invention.

FIG. 2 shows the top of the upper part of the equipment, standing out the soil recipient container (1) and the manometer (10). On the bottom of the soil recipient (1), there can be seen the manifold chamber (8) and the water-collecting pipe (9).

Figure 3:
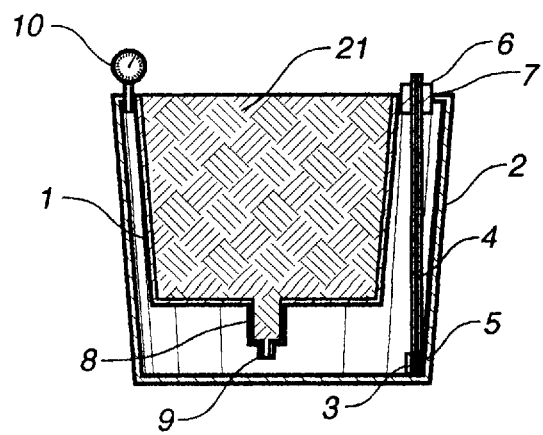
FIG. 3 is a cross-sectional view of the interior of the present invention as taken across lines A—A of FIG. 2.

FIG. 3 shows the internal details of the equipment in the cross-section AA. This figure indicates the position of the soil recipient container (1) in the external body (2), defining a space whose volume is initially filled-up with water under constant pressure. These conditions are attained because— —with the existence of humid soil in the soil recipient container (1)——all the available space for the water becomes hermetically sealed as the air-admitting pipe (4) has (on its lower end) the pressure cell (5) permanently plunged into water contained in the pressure well (3) where the level is constant and unrelated to the reservoir water level and is formed by the superposition of parts (1) and (2). The upper end of the air-admitting pipe (4) is open to the atmosphere, thus becoming the only means of access for the air towards the interior of the reservoir 5a. It is important to mention that the control of the water flow from the reservoir 5a to the soil is done continually by the pressure cell (5) through the menisci located on its own pores (illustrated in detail in FIGS. 7 and 8). The flow occurs automatically with the rupture of the menisci when the limit of tension is attained. After the rupture of the menisci, there occurs a process of admission of air into the reservoir 5a, and, consequently, water drops flow to the soil until the internal pressure of the reservoir 5a turns out to be equal or lower than the meniscular force. In such conditions, the menisci get recomposed automatically, thus obstructing the admission of air and also obstructing the water flow-off from the reservoir 5a into the soil. For each tension intended to be imposed to the water in the soil, there corresponds a conditioned meniscular curve which results from the diameter of the pores on the pressure cell (5). The pressure cell (5) can be manufactured with any value of tension.

FIG. 4 shows the arrangement of the parts that have the soil recipient container (1) as their basis. IN FIG. 4, both the manometer (10) as well as the air-admitting pipe (4) (though not fitting) are arranged to better indicate their relative positions and/or to expose their details.

FIG. 5 shows the external body (2) of the present invention showing the pressure well (3) which is located in the bottom of the external body (2). The water retained within the pressure well (3) is responsible for the formation of the menisci on the pressure cell (5).

FIG. 6 is the magnified view of the pressure well (3), as seen through the wall of the external body (2) of the equipment.

FIG. 7 illustrates an isolated view of the air-admitting pipe (4) of the present invention. It can be seen that the air-admitting pipe (4) is a tubular member having an open end (15) which will extend outwardly of the external body (2). A sealing cap (6) is fitted onto the exterior of the tubular pipe (4) so as to allow for sealing engagement between the pipe (4) and the sealing cavity (7) of the soil recipient container (1). With reference to FIG. 3, the body of the air-admitting pipe (4) will extend downwardly to the pressure cell (5). At the bottom end of the air-admitting pipe (4) is the pressure cell (5). The pressure cell (5) will extend downwardly into the pressure well (3) on the interior of the external body (2).

FIG. 8 is an isolated magnified view of the pressure cell (5) at the bottom of the air-admitting pipe (4). In particular, it can be seen that the pressure cell (5) includes a plurality of pores (17) which open to the bottom (19) of the air-admitting pipe (4). The pores (17) are a plurality of capillary tubes which extend in longitudinal alignment with the air-admitting pipe (4).

The stressmeter of the present invention associated the capillary effect through the pores (17) with atmospheric pressure. As a result, it offers more resistance to air flow to the interior of the water reservoir 5a. It is clear that a sub-atmospheric pressure is generated in the water reservoir 5a, but the water flow only occurs when the gradient of the soil moisture is sufficient to break the menisci in the pressure cell (5). This is the only possible point which would allow air to go into the reservoir 5a through the air-admitting pipe (4). Without the pressure cell (5), the stressmeter of the present invention would exhaust all water in the container at atmospheric pressure without resistance.

The pressure cell (5) includes a porous body. For air to enter the system, the air has to break the menisci in the pores (17) of the pressure cell (5). This represents a resistance. A vacuum is formed in the water reservoir 5a which is measured by the menisci 10 (negative pressure). The stressmeter of the present invention will consume water, under tension, with difficulty. By varying the diameter of the pores (17), different levels of resistance can be obtained.

The humidity gradient is simply formed in the soil (21) in the soil recipient container (1). The humidity gradient generates a suction in the collecting pipe (9) which, then, absorbs water from the water reservoir 5a through the manifold chamber (8). This, in turn, generates a drop in the inner pressure of the water reservoir 5a. This creates a force which pulls the menisci of the pressure cell (5) to a point where the breaking of the menisci occurs. An amount of air is then admitted into the water reservoir 5a so as to make the tension less negative. This allows water to flow to the soil and reduces the intensity of the humidity gradient of the soil. In other words, the soil will become more humid. With the decreasing of internal pressure in the water reservoir 5a, new menisci are automatically formed. As a result, these menisci will block new air flow into the water reservoir 5a. Again, when the humidity gradient is slowly raised (due to water consumption by the soil (21)), so as to reach a new desired level, the menisci are again broken and the system continues in a continuous manner.

Theoretical Concepts of the Present Invention

Water is composed of two atoms of hydrogen and one atom of oxygen ($H_2O$). The median diameter of the water molecule is 3A ($3 \times 10^{-8}$ cm) and the two atoms of hydrogen are attached to the oxygen atom forming an angle of 105° at a close estimate, and these attachments are responsible for the unbalance of the electric charges in the water molecule.

This asymmetric distribution of loads generates an electric dipole which is responsible for a number of physic-chemical characteristics of the water molecule. Owing to this polarity, the water molecules are oriented to make the water a good solvent and it can also be adsorbed by solid surfaces, dry or wet, by the ions and cathions besides colloidal materials.

Each part of hydrogen of a molecule is attached by the oxygen of the nearby molecules thus forming secondary connections (hydrogen bridges) which possess a weaker binding power in relation to the intramolecular connections of oxygen with hydrogen. As a result, water constitutes a molecular chain connected by hydrogen bridges, hence becoming a polymer.

As per the cynetic of the gases, the molecules of a liquid are in continuous movement, which movement is an expression of its thermal energy. The molecules collide against each other, and frequently absorb enough power to escape from the liquid and reach a gaseous state. Its cynetic energy is dispersed during the passage through the potential energy barrier originated from the molecules attraction on a liquid surface (measured by superficial tension).

Escaping from the liquid, the molecule gets into a gaseous state. In the same way, molecules from a gaseous state can return to a liquid state in a saturated condition from the gaseous state, and the same quantity of molecules leaving a given state will also come back.

In the liquid-gas interface, a typical phenomena there occurs and it is called surface tension. In the interface, the liquid behavior seems to be covered by an elastic membrane under constant tension, and also presenting a constant tendency to shrink (to assume a minimum area). This takes place due to the intensity of cohesive forces acting on molecules at the surface, which are higher toward the liquid state, being more dense, and this tendency makes the liquid surface shrink.

If we assume an arbitrary certain length L on the surface of a liquid, a force F is acting on both sides of the line with a tendency to oppose the surface. The quotient F/L is called surface tension $\sigma$ which magnitude is force versus unit of length (d/cm as in CGS). The same phenomena can be described in terms of energy. The increase of a liquid surface demands energy dispersion which stays stored in the enlarged surface and it can perform work if the surface contracts again. Energy per unit of area has the same magnitude per unit of length. Therefore, superficial tension can also be expressed in erg/cm$^2$ in CGS system. The surface tension is, then, a resistance measure to oppose the deformation of the elastic membrane created in a liquid/gas interface. It depends on the temperature which decreases as the enlargement grows. The decreasing of surface tension is also escorted by an increase of vapor pressure.

Figure 9:
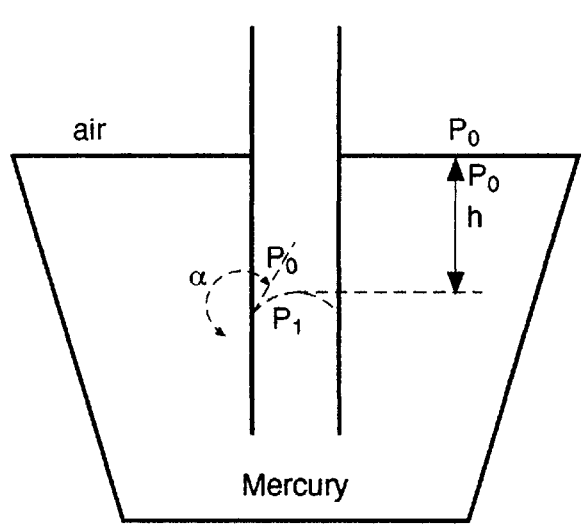
FIGS. 9–12 are graphical illustrations of the theoretical principles of the operation of the present invention.
Figure 10:
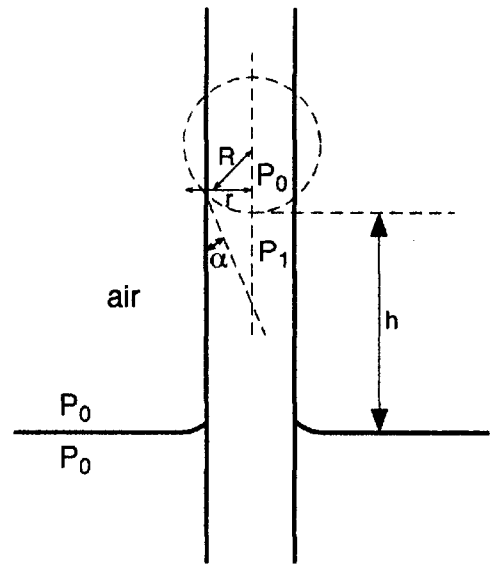

For flat surfaces of a liquid there exists no pressure differential among the points close to the top and bottom points of the liquid/gas interface. For curvilinear surfaces, there exists a pressure differential which is responsible for a sequence of capillary phenomena. The relationship between the curvature and the pressure is illustrated in FIGS. 9 and 10.

Disregarding the influence of the gravitational field and the peculiar conditions occurring in the junction of capillar/blister, we can assume that the blister keeps a spherical shape (which involves a smaller surface for a certain volume). Introducing a small amount of air into the blister (displacing the piston but keeping the same pressure P), its radius will reach R+dR. This also implies in an increasing of the blister surface of: $dA=4\pi(R+dR)-4\pi R^2=8\pi RdR$ (disregarding the terms of a superior class) and work W is done against the surface tension. This work is shown as:

$$dW=\sigma dA=\sigma 8\pi RdR \tag{1}$$

Simultaneously, the volume of the blister increases from: $dv=4/3d\pi(R+dR)^3-4/e\pi R^3=4\pi RdR^2$ (also disregarding the terms of a superior class). The volume increase against pressure P increases the same work amount as seen in (1) which can be figured by:

$$dW=PdV=P4\pi R^2\, dR \tag{2}$$

Combining (1) with (2) results in the relationship:

$$P=\frac{2\sigma}{R} \tag{3}$$

Figure 11:
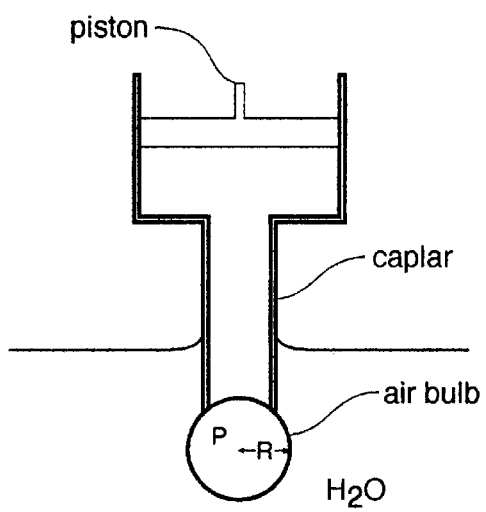
Figure 12:
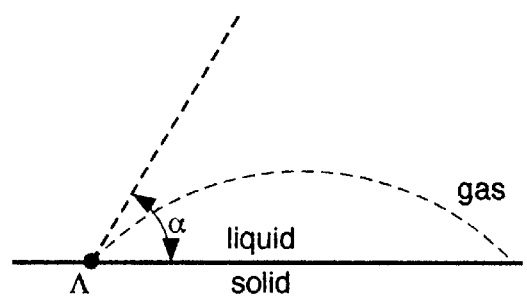

FIG. 11 is a diagram of the experiment aimed at the relation between curvature radius of a blister and its internal pressure. The result shows the pressure distinction between the blister pressure and encompassing water pressure which is directly proportional to surface tension and inversely proportional to the blister radius. If a drop of a liquid is placed on a flat surface of a solid, the liquid will settle on the solid and it will acquire a shapeless form in accordance with the graphical relationship shown in FIG. 12.

The tangent of liquid/gas interface at point (A) combined with the surface of the solid will form an angle ($\alpha$) which is typical in a combination liquid/gas, and it is called the contact angle. A contact angle equal to 0 degrees would represent a complete dispersion of the liquid on the solid surface or a complete "wetting" of the liquid on the soil. A contact angle equal to 180 degrees would correspond to "no wetting" or a total rejection of the liquid by the soil. The value of $\alpha$ will depend from the adsorption power between the liquid and the molecules of the solid. If this force between solid and liquid is higher than the cohesive forces inside the liquid and still higher than the forces between the gas and a solid, $\alpha$ tends to an acute angle and it is assumed that the liquid "wets the soil." Conversely, where $\alpha>90°$ C., it is assumed that the liquid is repelled by the solid.

The contact angle of a given liquid in a given solid is constant in general terms, in a given physical state. It can differ in dynamic conditions, i.e. when the liquid moves in relation to the solid. The contact angle of clean water over inorganic flat surface is 0 degrees most of the time, but rugosity or contamination absorbed by the surfaces makes differ from zero.

When a capillary tube is immersed into a liquid surface, the tube will form a meniscus as a result from the contact angle between the walls of the tube and the liquid. The curvature of the meniscus will be greater as much as the smaller diameter of the tube, and due to this curvature, a pressure differential in the liquid/gas interface occurs. A liquid with an acute angle will create a concave meniscus toward the side of the gas (water and glass) and a liquid with obtuse will create a convex meniscus toward the side of the gas (mercury and glass). In the first case, pressure $P_1$ under the meniscus is lower than the atmospheric pressure $P_0$ and in the second case $P_1$ is higher than $P_0$.

This is why in the first case, the liquid under the capillary tube is rejected by the capillary. If the angle of contact is null, the meniscus will be hemispheric and the curvature radius of the meniscus R will be equal to the radius of the tube r. For $\alpha$ between 0 and 90 degrees:

$$R=\frac{r}{\cos\alpha} \tag{4}$$

Due to this fact, the pressure distinction between the water under the meniscus and the atmosphere is given if we replace (4) by (3):

$$P = P_1 - P_0 = \frac{2\sigma\cos\alpha}{r} \quad (5)$$

As $P_1<P_0$ is negative, being in so far as a subatmospheric pressure normally called tension. Due to the existing capillaries existing in the soil, water in general is found to be under stress.

In the glass capillary tube, the water head is given by:

$$h = \frac{2\sigma\cos\alpha}{\rho g r} \quad (6)$$

Where: h is the head of water reached inside the capillary of radius "r"

σ is the surface tension if the water, which is function of temperature; its value at 25 degrees Celsius is 71.9 g.s$^{-2}$ α Contact angle for silica and water varies from 0 to 10

ρ Water density 1 g.cm$^{-2}$ g Gravity acceleration 981 cm.s$^{-2}$ r Radius of capillary tube in cm.

A draining of the capillary tube only requires a suction of a value of –h. To accomplish this, energy is required.

The soil has pores of several diameters, shapes and sizes. In any event, similar phenomena described for capillary tubes occur in soil. These phenomena will bestow a negative energy state in relation to the water contained in it. This negative state or tension is the matrix component ψm. Besides, the capillary phenomena also contributes to the adsorption power (attraction between the water and soil matrix) and adhesion (attraction among molecules of same nature) θ.

For a saturated soil θ=θs in which the pores are filled with water, there exists no menisci (water-air interface) and adsorption is also null. In this condition, the matrix component is null (ψM=0). With water going out of the pores the soil becomes less and less saturated (θ lower than θs) and air replaces the water at the larger pores in first place. The water coming our from the pores suctions air into the soil, thus promoting the formation of menisci and capillary function starts working to retain water. As a consequence, the matrix component m turns itself more negative.

Water always migrates to the small pores, in which the energy is more negative. Therefore, the lower the soil humidity θ, more negative the matrix potential. For values relatively high (wet soil), capillarity is the main phenomena to determine ψm. For this reason the pores set up are very important. For relatively low θ values (dry soil), water presents itself in the form of films covering the solid particles of the soil and the capillary phenomena looses its importance. In these conditions, adhesion is very important and due to it, ψm assumes pronunciated negative values. The pores set-up becomes less important because it does not contribute to affect the water adsorption.

In the soil, the total potential energy of water is the summational of all potential energies which act upon it (potential, gravitational, pressure, matrix and osmotic). To make it simple, it is called total potential. Each one of its parts is a component, so we have:

$$\psi = \psi_g + \psi_p + \psi_m + \psi_{os} + \ldots$$

where:

$\psi_g$ gravitational component
$\psi_p$ pressure component
$\psi_m$ matrix component
$\psi_{os}$ osmotic component Water moves in accordance to potential difference, always heading to a more negative potential.

Gradient is a physical grandeur that expresses the direction in which the potential field Δψ offers a high degree of increase. So, if the potential difference is divided by distance Δx between two points, and Δψ was measured between them, we then obtain a potential grad ψ.

$$\text{grad } \psi = \partial\psi/\partial x$$

The force responsible for water movement is equal to the gradient, but in a opposite direction. It is clear that water moves in the direction of a potential decrease. Thus, if there is a total potential gradient, a movement of water there occurs in the soil.

Working Principle In the STRESSMETER water gets in contact with the soil through a manifold chamber (8) located at the bottom of soil recipient (1) and any or all amount of water flux for the soil can only take place from this control device.

The water reservoir is formed by the internal part of piece (1) and the external part of piece (2), and when assembled they become one piece and the water reservoir is then sealed; and, in order to allow a water flux for the soil it is required admission of air for the internal part of the water reservoir. If water were free to flow the principle of communicating vessels would take place and an amount of water from the reservoir would freely flow and saturation of soil would then occur up to a point when the water level would be equal in both recipients (top and bottom parts of the vessels). So, as long as a level distinction existed there would also be a positive pressure pushing the water up and getting into the soil.

However, with the installation of the pressure cell (5) this inconvenience is eliminated because admission of air is governed by it, and when air admission occurs, the breaking of the meniscus takes place.

The pressure cell (5) comprises a sealing nipple from which a tube (4) is hung in it, and the said tube at its lower end contains a pressure cell (5) which constitutes the governing element of the air flow to the water reservoir.

The pressure cell comprises a porous element. In the pores of the pressure cell (5) a number of menisci are found and they block the air flow to the reservoir. Then the soil looses water, θ decreases and a potential gradient is formed along the depthness and the force is transmitted to the entire volume of soil stored at the recipient (1) and also to the water stored in the reservoir. As mentioned before, the pores of large diameters are drained firstly, and the total potential of water in the soil $\psi_s$ are getting more and more negative up to a point when a balance condition with the total potential of the pressure cell $\psi_c$ is reached. In these conditions, in other words, $\psi_s=\psi_c$ only the pores with smaller diameters or equal to the pores of the pressure cell contains water, besides the hydration cover film in the solid particles of the soil. But the atmosphere and the plant continues to drain water from the soil and the balance condition bends to be broken, being $\psi_c>\psi_s$. When the total potential gradient of water in the cell is smaller than the water total potential gradient in cell $\psi_c$, a tear of the menisci occur in the pressure cell (5), and consequently a volume of air (Δair) is admitted into the water reservoir, a much greater water amount will migrate to the soil thus decreasing the intensity of soil wetness gradient $$\partial\theta/\partial x.$$

This decrease allows the menisci in the pressure cell (5) to recompose instantaneously thus blocking any more air entrance to the water reservoir, then restoring the initial wetness in the soil, $$\partial\psi/\partial x$$

returns to intensify thus causing the menisci to tear, thus admitting proper air amounts to the water reservoir and the cycle goes on and on.

It is to be noted in this self-irrigating system, the humidity of the soil is constant and always below the saturation wetness θs, and this causes an excellent condition of aeration for the roots.

The required humidity θ is determined by the level of capillary pores of energy of the pressure cell (5) whose total potential ($\psi_c$) can be adjusted by the manufacturer. The variation band of the pressure cell (5) energy level can be from tenths of an atmosphere to 15 atmospheres.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. An apparatus for determining a critical level of soil humidity for plants comprising:

an external body;

a soil recipient container means hermetically sealed to said external body, said soil recipient container means for receiving a soil therein, said soil recipient container means having a collecting pipe thereon for passing water into the soil, said collecting pipe in communication with an interior of said soil recipient container means, said collecting pipe having an unobstructed open interior therethrough;

a well positioned within said external body, said well containing water therein;

a pressure cell means connected to said well to controllably pass water from said well into said collecting pipe of said soil recipient container means, said pressure cell means having an established resistance to the passage of water; and an air admitting pipe means in sealed relationship with said external body, said air admitting pipe means having an end opening exterior of said external body so as to allow air to pass into said air admitting pipe means, said air admitting pipe means communicating with said pressure cell means, said air admitting pipe means for transmitting air into said pressure cell means when energy in the soil recipient container means is higher than the resistance of said pressure cell means, said pressure cell means for urging water from the well into and through said unobstructed open interior of said collecting pipe.

2. The apparatus of claim 1, said pressure cell means being permanently under the water in said well, said pressure cell means having a plurality of pores formed therein.

3. An apparatus for determining a critical level of soil humidity for plants comprising:

an external body;

a soil recipient container means hermetically sealed to said external body, said soil recipient container means for receiving a soil therein, said soil recipient container means having a collecting pipe thereon for passing water into the soil, said collecting pipe having an interior passage;

a well positioned within said external body, said well containing water therein;

a pressure cell means connected to said well to controllably pass water from said well to said soil recipient container means, said pressure cell means having an established resistance to the passage of water, said pressure cell means being positioned within said external body away from said interior passage of said collecting pipe, said pressure cell means being permanently under the water in said well at a constant level, said pressure cell means for forming a meniscus having a pre-established strength for resisting water movement toward the soil; and an air admitting pipe means in sealed relationship with said external body, said air admitting pipe means having an end opening exterior of said external body to allow air to pass into said air admitting pipe means, said air admitting pipe means communicating with said pressure cell means, said air admitting pipe means for transmitting air into said pressure cell means when energy in the soil recipient container means is higher than the resistance of said pressure cell means, said pressure cell means for urging water from the well into said interior passage of said collecting pipe.

* * * * *